(12) United States Patent
Chou et al.

(10) Patent No.: US 8,270,495 B2
(45) Date of Patent: Sep. 18, 2012

(54) REDUCED BANDWIDTH OFF-LOADING OF ENTROPY CODING/DECODING

(75) Inventors: Jim Chen Chou, San Jose, CA (US); Rui Zhang, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 876 days.

(21) Appl. No.: 12/370,699

(22) Filed: Feb. 13, 2009

(65) Prior Publication Data

US 2010/0208825 A1    Aug. 19, 2010

(51) Int. Cl.
*H04N 7/26* (2006.01)
(52) U.S. Cl. .................... 375/240.23; 375/240.1
(58) Field of Classification Search ........... 375/240.1, 375/240.23
See application file for complete search history.

(56) References Cited

U.S. PATENT DOCUMENTS

| | | | | |
|---|---|---|---|---|
| 7,769,790 | B2 * | 8/2010 | Amon et al. | 707/812 |
| 2005/0147173 | A1 * | 7/2005 | Winger et al. | 375/240.23 |
| 2007/0177813 | A1 * | 8/2007 | Yang | 382/233 |
| 2007/0297501 | A1 * | 12/2007 | Hussain et al. | 375/240 |
| 2008/0175325 | A1 * | 7/2008 | Hannuksela et al. | 375/240.26 |

OTHER PUBLICATIONS

Marpe et al., "The H.264/MPEG4 Advanced Video Coding Standard and its Applications", Aug. 2006, IEEE Communications Magazine, pp. 134-143.*

International Telecommunication Union, "Advanced Video Coding for Generic Audiovisual Services", H: Audiovisual and Multimedia Systems Infrastructure of Audiovisual Services-Coding of Moving Video; ITU-T Recommendation, H. 264; 2005-2008, pp. 1-564.

Schwarz et al., "Overview of the Scalable Video Coding Extension of the H. 264/AVC Standard", IEEE Transactions on Circuits and Systems for Video Technology, vol. 17, No. 9, Sep. 2007, pp. 1103-1120.

Texas Instrument, "Digital Media-System-On-Chip", SPRS403C; Dec. 2007; Revised Oct. 2008; pp. 1-341.

* cited by examiner

*Primary Examiner* — Matthew Smithers
(74) *Attorney, Agent, or Firm* — Edell, Shapiro & Finnan, LLC

(57) ABSTRACT

Techniques are provided herein to produce encoded video bitstreams and to similarly decode encoded video bitstreams according to a coding standard not supported by an on-chip encoder/decoder. For purposes of encoding, a video sequence is received at a first device. A first bitstream is generated at the first device by encoding the video sequence according to a first coding standard and information associated with the video sequence is generated at the first device according to a second coding standard. The first bitstream and the information are then transmitted to a second device. At the second device the first bitstream is decoded to produce a second bitstream. The second bitstream and the information are combined by removing syntax elements associated with the first coding standard from the second bitstream and adding the information to produce a third bitstream according to the second coding standard. Similar techniques are provided for decoding an encoded bitstream to recover a video sequence.

24 Claims, 8 Drawing Sheets

REDUCED BANDWIDTH OFF-LOADING OF ENTROPY CODING/DECODING

BACKGROUND

Many microprocessors use a hardware accelerator to perform entropy coding for video encoding and decoding. The hardware accelerator, however, is fixed to particular coding and decoding (codec) standard and cannot be used for new codec standards. As a result, the entropy coding task for new codec standards must be performed in software or off-loaded from the microprocessor to another computation device.

If entropy coding is performed in software many of these same microprocessors with fixed codecs also do not possess the processing capability sufficient to entropy code video without using a hardware accelerator. When the entropy coding task is off-loaded to another device, then the main challenge is the input/output and memory bandwidth needed to send data to be entropy coded/decoded to/from the other hardware. For example, the data to be transmitted/received to/from the other device may include, in the case of video encoding/decoding a residual bitstream, motion vectors, and codec specific side information.

DESCRIPTION OF EXAMPLE EMBODIMENTS

Overview

Techniques are provided herein to produce encoded video bitstreams and to similarly decode encoded video bitstreams according to a coding standard not supported by an on-chip encoder/decoder (ECD). For the purpose of encoding, a video sequence is received at a first device. A first bitstream is generated at the first device by encoding the video sequence according to a first coding standard and information associated with the video sequence is encoded at the first device according to a second coding standard. The first bitstream and the information are then transmitted to a second device. At the second device the first bitstream is decoded to produce a second bitstream. The second bitstream and the information are combined by removing syntax elements associated with the first coding standard from the second bitstream and adding the information to produce a third bitstream according to the second coding standard.

Similarly, techniques are provided herein to perform such functions in reverse. At a first device, a first bitstream encoded according to a first coding standard is received. A decoded bitstream is generated at the first device by decoding the first bitstream encoded according to the first coding standard. Information associated with the first coding standard is extracted from the decoded bitstream and syntax elements are added according to a second coding standard to produce a second bitstream according to the second coding standard. The second bitstream and the information are transmitted to a second device. At the second device, the second bitstream and the information are decoded to produce a video sequence.

Described herein are ways to encode (entropy code) a video sequence and to decode an encoded video sequence when the on-chip ECD does not support a needed video codec by using off-chip logic to complete the encoding process. In the following description, a method is described for encoding a video sequence into an MPEG-4 H.264 scalable video coding (SVC) compliant bitstream using a digital signal processor (DSP) and a field programmable gate array (FPGA), as well as a method for decoding an encoded bitstream to recover a video sequence using a DSP and an FPGA. The DSP has an on-chip hardware accelerator (e.g., an ECD) with MPEG-4 H.264 advanced video codec (AVC) encoding capability. SVC is a newer superset of the H.264 AVC video codec recommendation. It should be understood that these video standards are examples only. The techniques described herein can easily be used for other coding standards. The fact that SVC and AVC have a subset/superset relationship within the standard makes these techniques easier, but this is not meant to be limiting.

Figure 1:
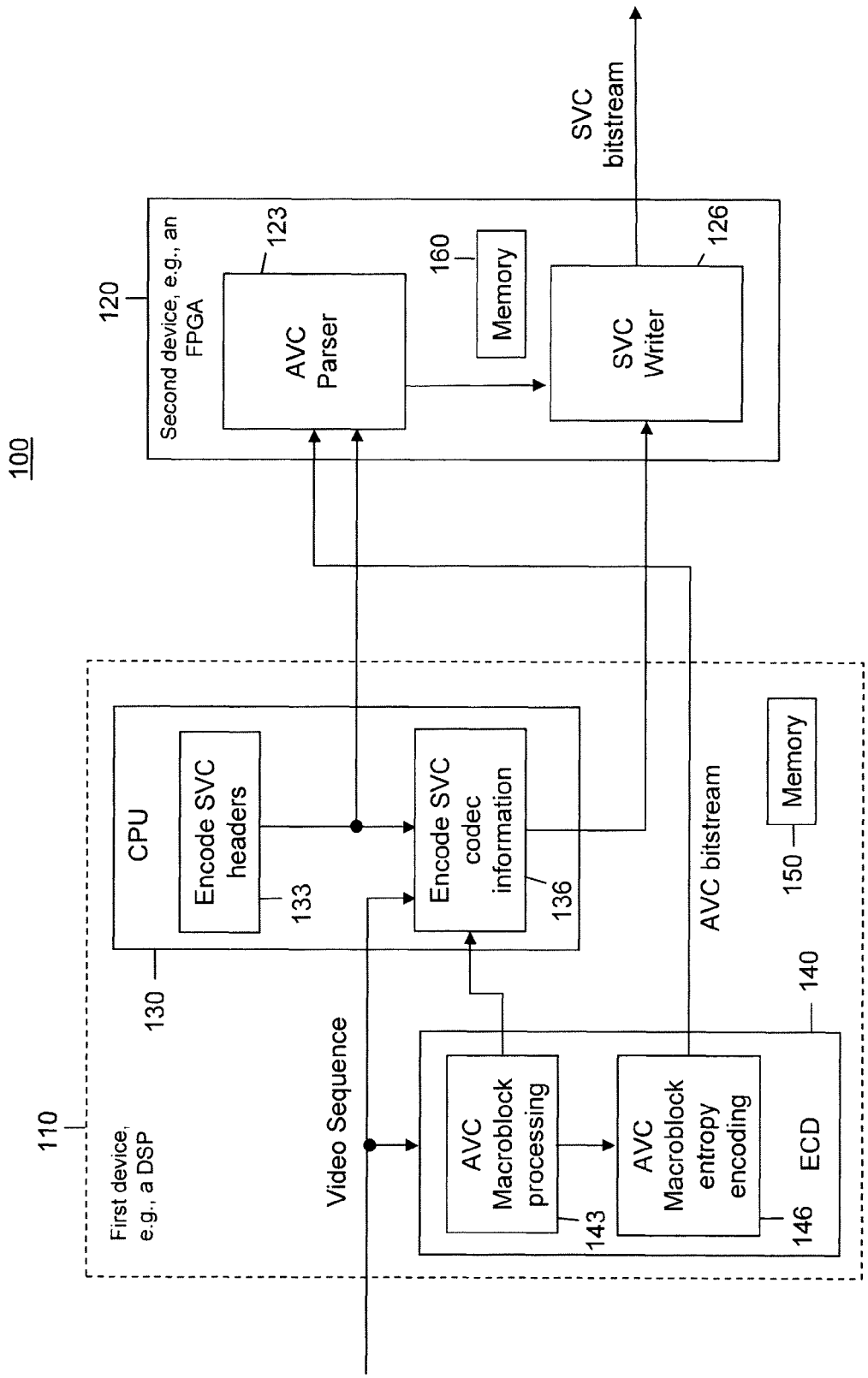
FIG. 1 is an example block diagram of an apparatus that is configured to efficiently off-load data for entropy encoding a video sequence.

Referring first to FIG. 1, an apparatus for producing an SVC compliant bitstream from a video sequence is shown generally at reference numeral 100 and comprises a first processing device, e.g., a DSP 110, and a second logic device, e.g., an FPGA 120. The DSP 110 and the FPGA 120 may be connected to other devices (not shown) for reception and transmission of video sequences, data, and the like. Various signal paths are shown between the DSP 110 and the FPGA 120. These signal paths are representative of the type of data sent between the two devices and are not meant to be limiting, e.g., all of the signals may be transmitted or received from a single hardware data link on either device, or multiple data links may be used to transmit/receive data. For simplicity, various receiving, transmitting, converting (e.g., analog-to-digital converter), and supporting (power supply, etc.) components in the apparatus are not shown.

The DSP 110 comprises an ECD 140, a central processing unit (CPU) 130, and a memory 150. The ECD 140 is configured to perform AVC macroblock processing 143 and AVC macroblock entropy encoding 146 functions. In this example embodiment, however, the AVC macroblock processing function 143 and AVC macroblock entropy encoding function 146 do not complete the encoding process as certain functions have been off-loaded from the ECD 140 in order to produce the SVC compliant bitstream. The CPU 130 is configured with function blocks to encode SVC headers at 133 and that encode SVC codec information at 136. Blocks 133, 136, and functions of the ECD 140 are described in more detail in conjunction with FIG. 2.

The functions of the DSP 110 may be implemented by logic encoded in one or more tangible media, e.g., instructions embedded in a programmable read-only memory (PROM) that are read at apparatus boot up, or as instructions stored in the memory 150. The memory 150 may be separate or part of the DSP 110 or a combination thereof. The memory 150 may also be used to store data, and buffer video sequences and bitstreams.

The FPGA 120 comprises an AVC parser 123, an SVC writer 126, and a memory 160. Blocks 123, 126, and functions of the FPGA 120 are described in more detail in conjunction with FIGS. 2, 3, and 4. The functions of the FPGA 120 may be implemented by logic encoded in one or more tangible media (e.g., embedded logic such as an application specific integrated circuit (ASIC), digital signal processor instructions, software that is executed by a processor, etc.). Thus, the functions of the FPGA 120 may be implemented with fixed logic or programmable logic (e.g., a programmable processor, programmable digital logic (e.g., an FPGA) or ASIC that comprises fixed digital logic, or a combination thereof. The memory 160 may be used to buffer bitstreams, and store instructions and data.

Generally, the processing capability of the CPU 130 is not sufficient to entropy encode the video sequence in accordance with the second coding standard, or an output communications bandwidth capability of the CPU 130 is not sufficient to fully offload data to the second device in order to entropy encode the video sequence in accordance with the second coding standard.

Figure 2:
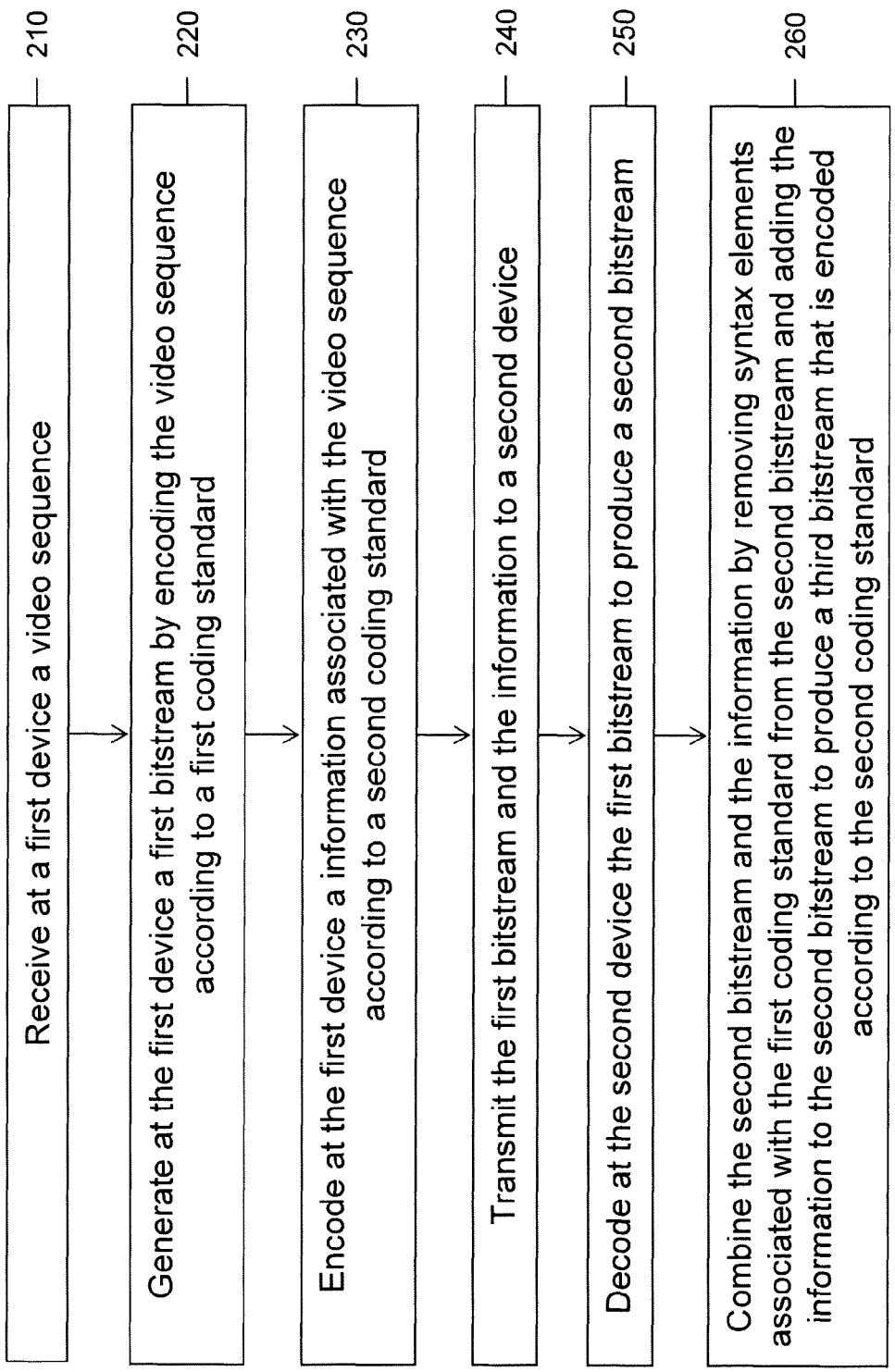
FIG. 2 is an example flow chart generally depicting a process to efficiently off-load computations for entropy encoding a video sequence.

Turning now to FIG. 2, with continued reference to FIG. 1, a process 200 for producing an SVC compliant bitstream from a video sequence that uses efficient off-loading techniques is now described. At 210, a video sequence is received at a first device, e.g., the DSP 110. The video sequence is sent to the ECD 140 and to the encode SVC codec information block 136 of the CPU 130. At 220, a first bitstream is generated at the first device by encoding the video sequence according to a first coding standard. In one example, the ECD 140 generates an AVC compliant bitstream by encoding the video sequence using the AVC macroblock processing function 143 and the AVC macroblock entropy encoding function 146. The AVC macroblock processing function 143 provides macroblock data to the encode SVC codec information block 136. For example, the AVC macroblock processing function 143 sends motion vector difference bitmaps (mvdBitmap), motion vector differences (mvd), and auxiliary information that specifies the values of new syntax elements to block 136 for producing the SVC bitstream.

The mvdBitmaps comprise 16 bits per macroblock with each bit corresponding to a 4×4 (16) tile or 16 (256÷16) tiles in a 16×16 (256) macroblock. The macroblock may be divided or partitioned into blocks as small as a single tile in order to increase the coding gain. If any tile in the partition has a coded inter-layer motion vector difference then the first bit of the bits allocated to the partition in the mvdBitmap is set to 1 and the remaining allocated bits are set to 0. Thus, when the first bit of the bits allocated to the partition is set to 1 it signifies a partition with a motion vector difference and this indirectly identifies the partitions within the macroblock. For example, given an mvdBitmap of 1000 0000 1000 0000 (binary), then this indicates a partition of two 16×8 blocks of 8 tiles each (1 plus 7 zeros).

The mvds, on the other hand, comprise up to 16 bytes per macroblock. There is one motion vector difference for each partition with a maximum resolution of 8×8 (64) partitions, or four (256÷64) 8×8 partitions per macroblock. Each mvd has an x and y component that consist of two bytes each. Mvds are only defined for a corresponding non-zero motion prediction flag. If all corresponding motion prediction flags are non-zero then all 16 bytes are used, i.e., 4 partitions×2 bytes for x components×2 bytes for y components (4×2×2=16).

At 230, information associated with the video sequence is encoded at the first device according to a second coding standard. For example, the encode SVC codec information block 136 of the CPU generates sequence parameters, picture parameters, and slice headers according elements in the macroblock_layer( ) structure of the slice_data( ) structure. These syntax elements do not exist in the AVC codec. Since these flags cannot be generated by the ECD 140, they must be generated elsewhere. In this example, the flags are generated by the encode SVC codec information block 136 and are set to 1 if the corresponding to the SVC standard (hereinafter, collectively "SVC headers") The SVC headers are used in the SVC bitstream and are sent to block 123 of the FPGA 120 and block 136 for generating SVC information. Block 136 uses the video sequence, mvdBitmaps, mvds, and the SVC headers to encode the SVC information.

Specifically, the SVC standard (codec extension) defines a base_mode_flag, a residual_prediction_flag, and motion_prediction_flag syntax flag is defined for the specified macroblock, otherwise the value is set to 0. The flags are defined according to the logic of the macroblock_layer( ) and slice_data( ) structures in the SVC standard.

Once encoded, the SVC information comprises (for each slice):

1. An SVC information header specifying an output format, e.g., CAVLC or CABAC (1 byte)
2. The base_mode_flag (1 byte, 1 bit per macroblock)
3. The residual_prediction_flag (1 byte, 1 bit per macroblock)
4. The motion_prediction_flag (2 bytes per macroblock=16 bits per macroblock, 1 byte equaling 8 bits)
5. mvdBitmap (2 bytes per macroblock=16 bits per macroblock)
6. mvds (2 bytes per motion vector difference, maximum of 16 bytes or 128 bits per macroblock).

The macroblocks within a frame are divided into groups of eight, numbered 0 through 7. The information numbered 4 through 6 above is repeated for macroblocks 0 though 7. On a per macroblock basis, the number of bits per macroblock for the SVC information is 162 bits (1 base_mode_flag+1 residual_prediction_flag+16 motion_prediction_flags+16 bits per mvdBitmap+128 bits (max) for mvds). The SVC information header, specifying an output format, is sent only once per video sequence and is therefore negligible. The total data bandwidth for sending the SVC information equals the number_of_macroblocks_per_frame x×number_of_frames per_second×the number of bits of SVC information per macroblock. For example, a high definition 1080p30 sequence has a resolution of 1920×1080 (pixels) and is sent at 30 frames per second. The 1080 component must be rounded up to the next multiple of 16 to 1088 for codec processing. The maximum data bandwidth is:

$$1920 \times 1088 \text{ pixels} \div 256 \text{ pixels per macroblock} = 8160$$
$$\text{macroblocks per frame (MBPF)}$$

$$8160 \text{ MBPF} \times 30 \text{ frames per second} = 244{,}800 \text{ macroblocks per second (MPS)}$$

$$244{,}800 \text{ MPS} \times 162 \text{ bits per macroblock} = 39{,}657{,}600$$
$$\text{bits per second} = 4{,}957{,}200 \text{ bytes per second or}$$
$$\sim 5 \text{ megabytes per second (5 MB/sec)}$$

Next, at 240, the information and the first bitstream are transmitted to a second device. At 250, the first bitstream is decoded at the second device to produce a second bitstream. In one example, the second device is the FPGA 120. At 260, the second bitstream and the information are combined by removing syntax elements associated with the first coding standard from the second bitstream and adding the information to the second bitstream to produce a third bitstream that is encoded according to the second coding standard. In one example, the first coding standard is the AVC standard, and the information is SVC-based information.

Figure 3:
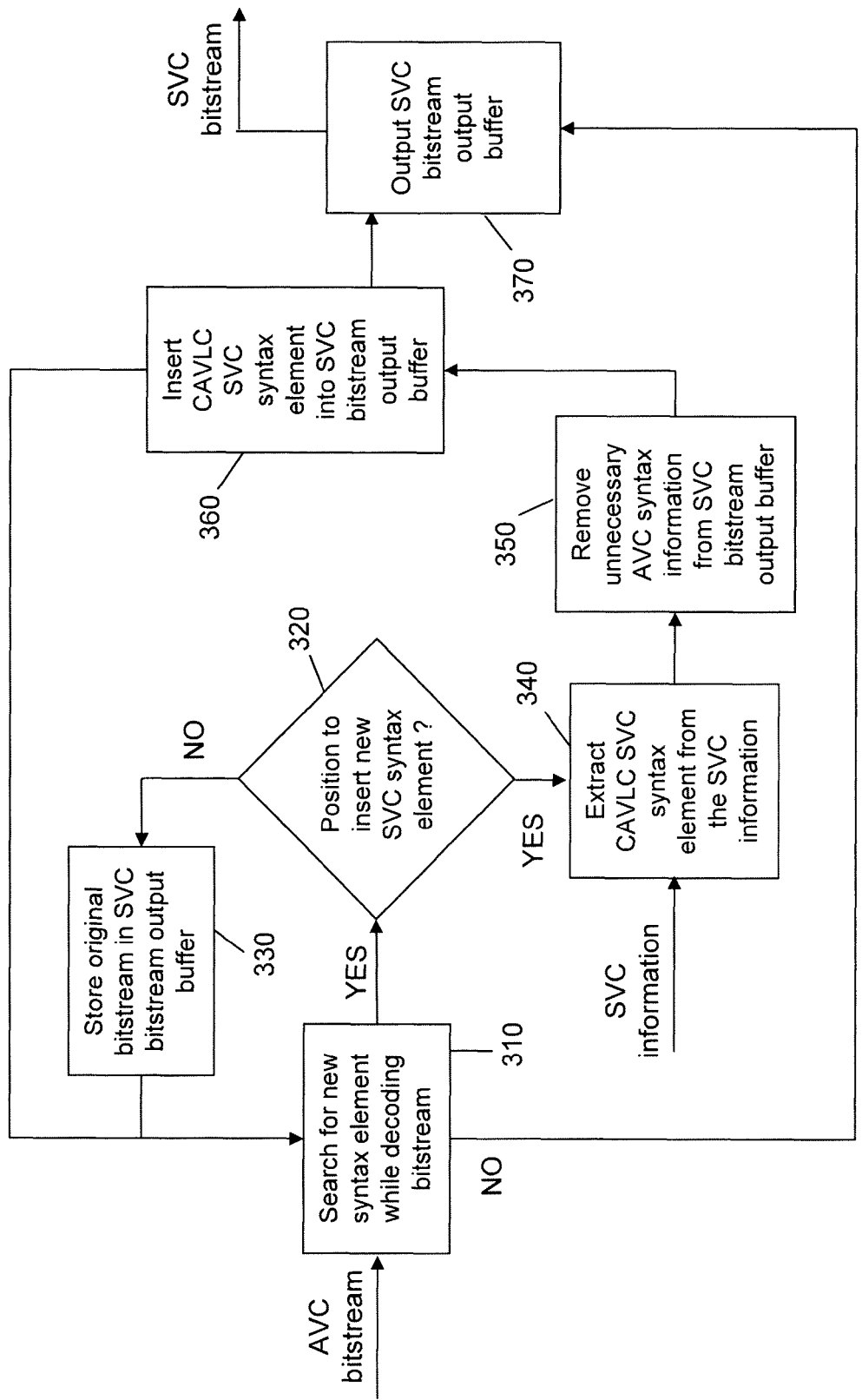
FIG. 3 is an example flow chart depicting a first process that converts a bitstream between two coding standards in the course of the encoding process shown in FIG. 2.

The decoding step 250 and the combining step 260 are now further described with reference to FIG. 3 according to one example for producing an SVC compliant bitstream and with continued reference to FIG. 1. In addition, the function blocks 123 and 126 of the FPGA 120 are described in greater detail with reference to FIG. 3. At 310, the AVC parser 123 searches (parses) for a new syntax element while decoding the AVC bitstream. If a new syntax element is not found, then the original AVC bitstream is preserved in an SVC bitstream output buffer as it is being decoded because most of the original AVC (encoded) bitstream can be reused (except for the AVC syntax elements). If a new syntax element is found, then at 320, the AVC parser 123, using the decoded AVC bitstream and the SVC headers encoded by block 133, determines if a resulting SVC bitstream is ready for a new SVC syntax element. If it is determined that the bitstream is not ready, then at 330, the original bitstream is stored in the SVC bitstream output buffer. If it is determined that a new SVC syntax element is to be inserted, then at 340, the SVC writer 126 extracts the SVC syntax element from the SVC information. The syntax element is extracted according to one of the formats in the MPEG-4 H.264 standard.

The H.264 standard specifies encoding AVC or SVC bitstreams in a context-adaptive variable-length coding (CAVLC) format or in a context-based binary arithmetic coding (CABAC) format. The format is determined by settings contained in the SVC information header noted above and is selected based on system requirements. For the case where the output is to be coded in CAVLC format, the base_mode_flag, residual_prediction_flag, and motion_prediction_flag SVC syntax elements are coded with fixed length codes. For the CABAC case, the syntax elements are coded as arithmetic codes. At 340, as mentioned above, the extracted syntax elements are in the CAVLC format.

Next, at 350, unnecessary AVC syntax elements are removed from the decoded bitstream in the SVC bitstream output buffer. The ECD 140 of the first device encoded the AVC bitstream according to the AVC codec, and the AVC bitstream contains unnecessary information or information that will be replaced by SVC bitstream information. The SVC writer 126 removes the unnecessary AVC information from the SVC bitstream. At 360, the SVC syntax element in the CAVLC format is inserted into the SVC bitstream output buffer and the process continues at 310. The SVC syntax elements may simply be inserted because they are fixed length codes that do not require any encoding. The resultant bitstream is an SVC compliant bitstream in the CAVLC format. At 370, the SVC compliant bitstream is output from the SVC bitstream output buffer.

Figure 4:
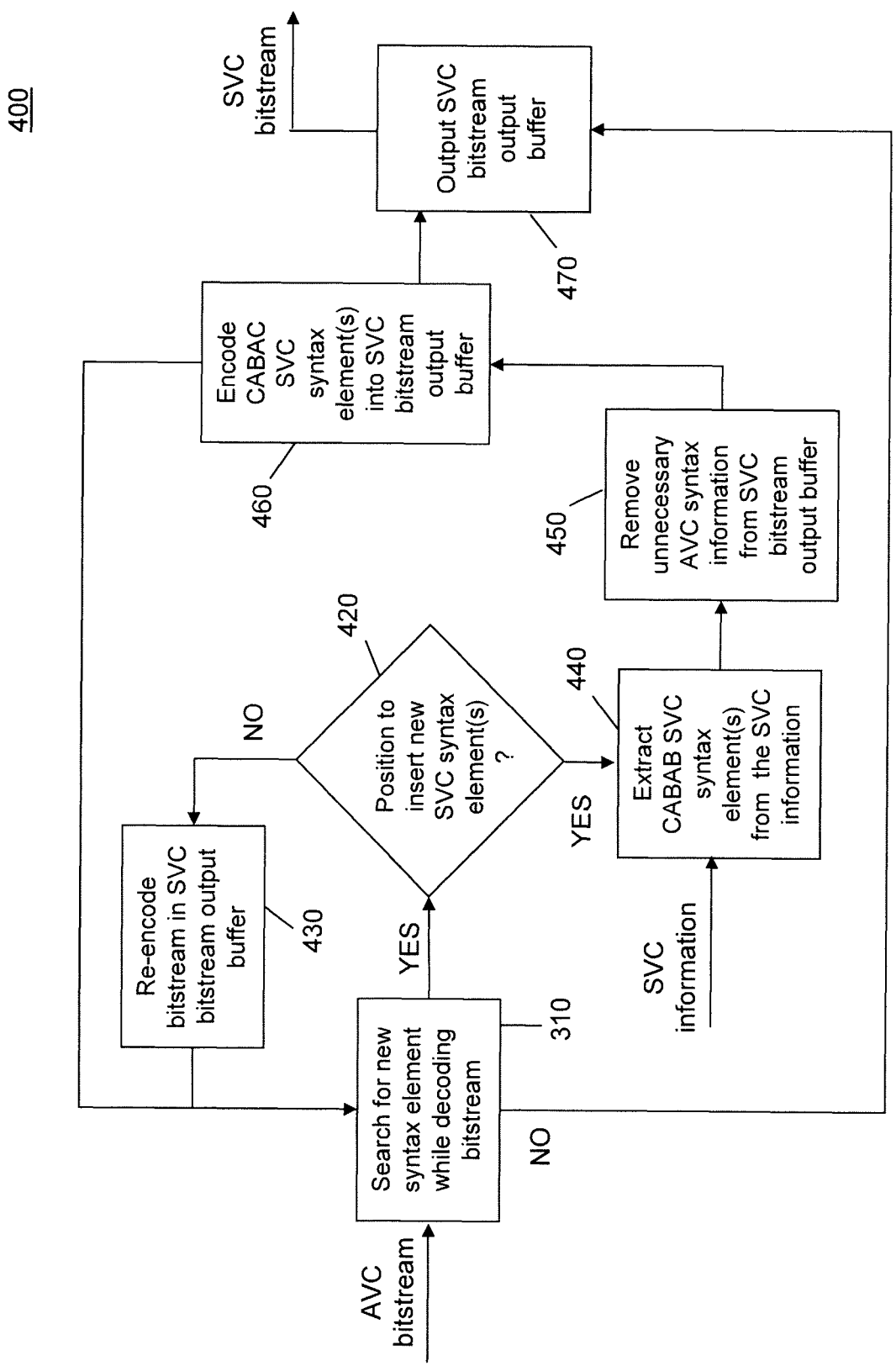
FIG. 4 is an example flow chart depicting a second process that converts a bitstream between two coding standards in the course of the encoding process shown in FIG. 2.

Another example for producing an SVC compliant bitstream at the second device (steps 250 and 260 of FIG. 2) is described in conjunction with FIG. 4. In this example, the SVC bitstream is produced in the CABAC format.

At 410, the AVC parser 123 searches for new syntax element(s) while decoding the AVC bitstream. The AVC parser 123 may have to search for more than one syntax element since the SVC syntax elements in a CABAC format are arithmetically coded into a single codeword, and therefore, may comprise more than one syntax element. If a new syntax element is not found, then the decoded AVC bitstream is preserved in an SVC bitstream output buffer as it is being decoded for later re-encoding. At 420, the AVC parser 123, using the decoded AVC bitstream and the SVC headers determines if a resulting SVC bitstream is ready for new SVC syntax element(s). If the bitstream is not ready, then at 430, the decoded bitstream is re-encoded in the SVC bitstream output buffer. In contrast to the CAVLC example in which the original bitstream is preserved, in this example the original bitstream is discarded and the decoded bitstream is stored. The reason for storing the decoded bitstream is that the SVC output bitstream must be arithmetically re-encoded in order to produce an SVC bitstream in the CABAC format. One advantage of the CAVLC format is its simplicity, whereas the CABAC format has the advantage of a significantly lower output bit rate If the SVC parser 123 determines that a resulting SVC bitstream is ready for a new SVC syntax element, then at 440, the SVC syntax element(s) are extracted from the SVC information. At 450, unnecessary AVC syntax elements are removed from the decoded bitstream in the SVC bitstream output buffer by the SVC writer 126. At 460, the SVC syntax element(s) and the SVC bitstream output buffer are arithmetically coded to produce an SVC compliant bitstream in the CABAC format and the process then continues at 410. At 470, the SVC compliant bitstream is output from the SVC bitstream output buffer.

Figure 5:
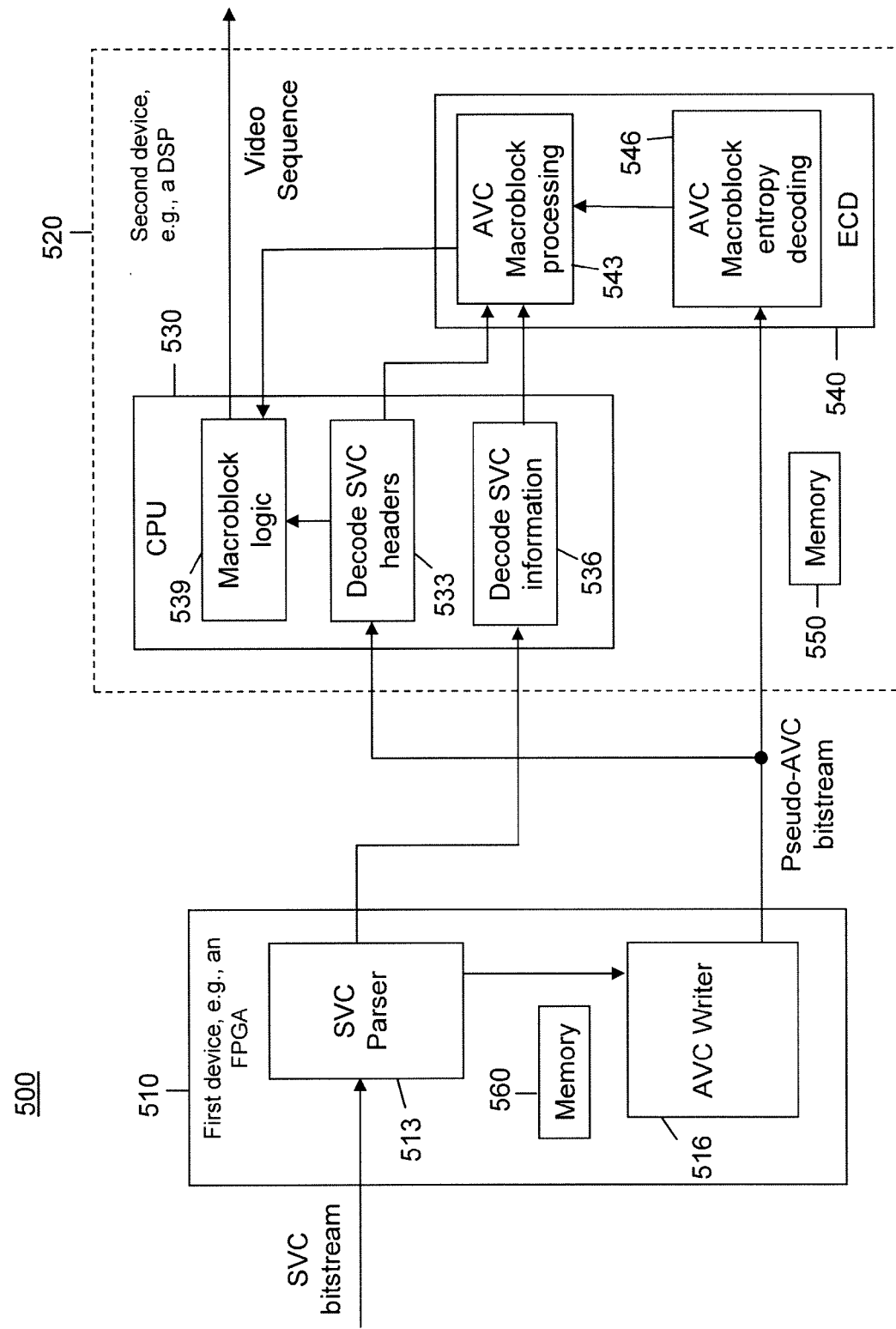
FIG. 5 is an example block diagram of an apparatus that is configured to efficiently off-load computations for entropy decoding a video sequence.

The examples described above relate to methods to produce SVC compliant bitstreams from a video sequence. Now, in conjunction with FIGS. 5-8, methods to produce a video sequence from SVC compliant bitstream are described. Turning now to FIG. 5, an apparatus for producing a video sequence from an SVC compliant bitstream is shown generally at reference numeral 500 and comprises a first logic device, e.g., an FPGA 510, and a second processing device, e.g., a DSP 520. As is apparent, the devices of the apparatus shown in FIG. 5 are in the reverse order of the devices depicted in FIG. 1 and the function blocks shown in FIG. 5 are configured to perform approximately the inverse functions of those blocks depicted in FIG. 1. The FPGA 510 and the DSP 520 may be connected to other devices (not shown) for reception and transmission of video sequences, data, and the like. Various signal paths are shown between the FPGA 510 and the DSP 520. These signal paths are representative of the type of data sent between the two devices and are not meant to be limiting, e.g., all of the signals may be transmitted or received from a single hardware data link on either device, or multiple data links may be used to transmit/receive data. As in FIG. 1, for simplicity, various receiving, transmitting, converting (e.g., analog-to-digital converter), and supporting (power supply, etc.) components in the apparatus are not shown.

The FPGA 510 comprises an SVC parser 513, an AVC writer 516, and a memory 560. Blocks 513, 516, and functions of the FPGA are described in more detail in conjunction with FIGS. 6, 7, and 8. The functions of the FPGA 510 may be implemented by logic encoded in one or more tangible media (e.g., embedded logic such as an ASIC, digital signal processor instructions, software that is executed by a processor, etc.). Thus, the functions of the FPGA 510 may be implemented with fixed logic or programmable logic (e.g., a programmable processor, programmable digital logic (e.g., an FPGA) or an ASIC that comprises fixed digital logic, or a combination thereof. The memory 560 may be separate or part of the FPGA 510 or a combination thereof. The memory 560 may be used to buffer bitstreams, and store instructions and data.

The DSP 520 comprises a CPU 530, an ECD 540, and a memory 550. The CPU 530 comprises blocks that decode SVC headers 533, decode SVC codec information 536, and a perform macroblock logic block 539 that produces a video sequence. The ECD 540 comprises macroblock processing block 543 and AVC macroblock entropy decoding block 546. Blocks 533, 536, and functions of the ECD 540 are described in more detail in conjunction with FIG. 6.

The functions of the DSP 520 may be implemented by logic encoded in one or more tangible media, e.g., instructions embedded in a programmable read-only memory that is read at apparatus boot up or instructions stored in the memory 550. The memory 550 may be separate or part of the DSP 520 or a combination thereof. The memory 550 may be used to store data and instructions, and buffer video sequences and bitstreams.

Generally, the processing capability of the CPU 530 is not sufficient to entropy decode the video sequence according to the first coding standard or the communications bandwidth capability of the CPU 530 is not sufficient to fully upload data in order to entropy decode the video sequence in accordance with the first coding standard.

Figure 6:
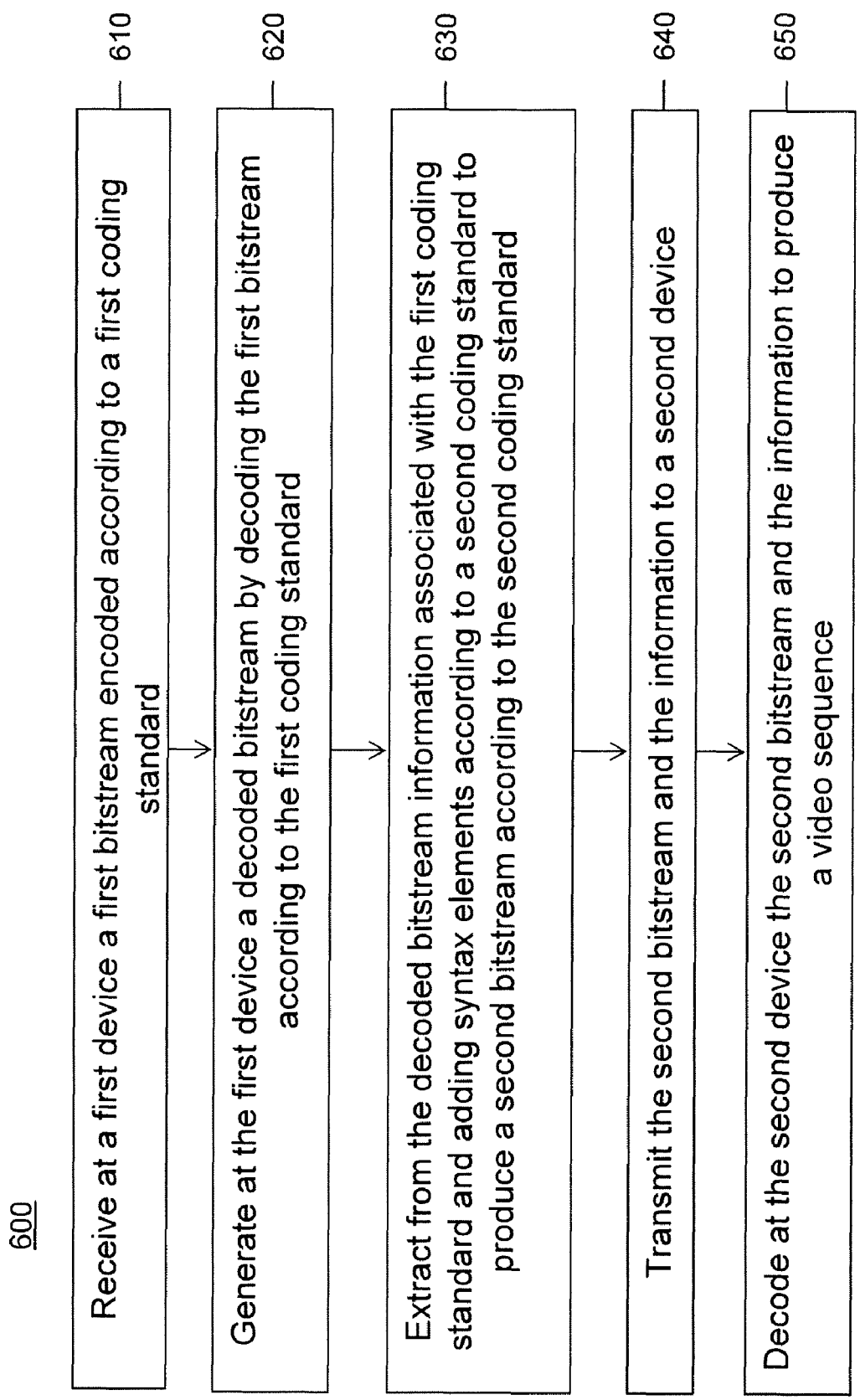
FIG. 6 is an example flow chart generally depicting a process that efficiently off-loads data for entropy decoding a video sequence.

Turning now to FIG. 6, with continued reference to FIG. 5, a process 600 for producing a video sequence from an SVC compliant bitstream is now described. At 610, a first bitstream that is encoded according to a first coding standard, e.g., an SVC bitstream, is received at a first device, e.g., at the FPGA 510. The SVC bitstream is received by the SVC parser 513 function block of the FPGA 510. At 620, a decoded bitstream is generated at the first device by decoding the first bitstream to according to a first coding standard. In one example embodiment the SVC parser 513 generates the decoded bitstream by decoding the SVC bitstream. The decoded bitstream is sent to the AVC writer 516.

At 630, information is extracted from the decoded bitstream that is associated with the first coding standard and syntax elements are added according to a second coding standard to produce a second bitstream according to the second coding standard.

At 640, the second bitstream and the information are transmitted to a second device. In one example, the FPGA 510 sends the SVC information and a pseudo-AVC bitstream to the DSP 520. At 650, the second bitstream and the information are decoded at the second device to produce a video sequence. In one example, the SVC information is decoded by the decode SVC information block 536 of the CPU 530. The decoded SVC information is used by the decode SVC information block 536 to perform inter-layer motion vector prediction, coefficient scaling and inter-layer logic in order to produce the video sequence from the SVC compliant bitstream. The predictions are sent to the AVC macroblock processing block 543 of the ECD 540 for macroblock processing.

The pseudo-AVC bitstream is sent by the FPGA 510 to the decode SVC headers block 533 of the CPU 530 and the AVC macroblock entropy decoding block 540 of the ECD 540. The decode SVC headers block 533 decodes the sequence parameters, picture parameters, and slice headers contained in the pseudo-AVC bitstream that are in SVC format and sends the decoded information to the AVC macroblock processing block 543 and the macroblock logic block 539. The AVC macroblock entropy decoding block 546 performs AVC entropy decoding of the pseudo-AVC bitstream. The decoded pseudo-AVC bitstream is provided to the AVC macroblock processing block 543. The AVC macroblock processing block 543 uses the decoded SVC headers, decoded pseudo-AVC bitstream, and the inter-layer motion vector predictions to produce processed macroblocks. The processed macroblocks are then sent to the macroblock logic block 539 of the CPU 530. The macroblock logic block 539 performs final processing to produce the video sequence.

Figure 7:
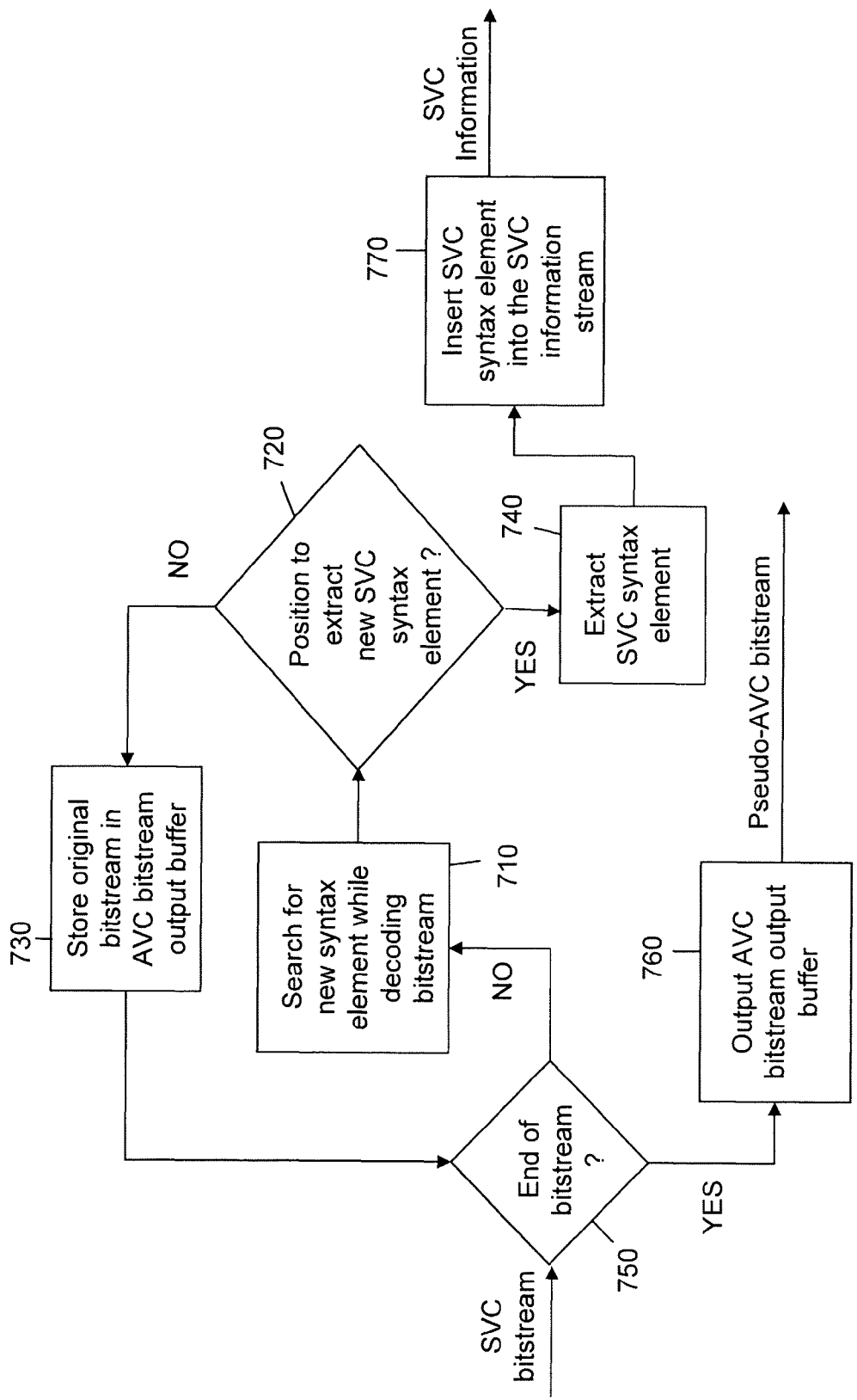
FIG. 7 is an example flow chart depicting a first process that converts a bitstream between two coding standards in the course of the decoding process shown in FIG. 6.

Reference is now made to FIG. 7 for more details on the extracting step 630 for SVC bitstreams in the CAVLC format. The function blocks 513 and 516 of the FPGA 510 are also described in greater detail with reference to FIG. 7. At 750, the SVC parser 513 monitors the incoming SVC bitstream for an endpoint, and at 710, searches for a new syntax element while decoding the SVC bitstream. The original SVC bitstream is preserved as it is being decoded because most of the original SVC bitstream can be reused (except for the SVC syntax elements) when the AVC bitstream is output in CAVLC format. At 720, the SVC parser 513 determines if the decoded bitstream is ready for a new SVC syntax element to be extracted. If it is determined that the bitstream is not ready, then at 730, the original bitstream is stored in an AVC bitstream output buffer. If the bitstream is ready for a new syntax element to be extracted, then at 740, the SVC parser 513 extracts the SVC syntax element from the decoded bitstream. At 770, the SVC parser 513 inserts or encapsulates the SVC syntax element into the SVC information stream. The SVC information comprises an SVC information header, a base_mode_flag, a residual_prediction_flag, a motion_prediction_flag, mvdBitmaps, and mvds in the same format described above in conjunction with FIG. 2. In this example embodiment, mvds are sent for all (motion_prediction_flag=0 or 1) partitions because the motion vector prediction must be performed in software since the ECD 540 is incapable of performing the inter-layer motion vector prediction enabled by the SVC standard.

Referring again to 750, the SVC parser 513 determines if the incoming SVC bitstream is at an endpoint. If and endpoint has not been reached the process continues as described above. If an endpoint has been reached the AVC writer 516 outputs the original SVC bitstream, less the extracted SVC syntax elements, as a pseudo-AVC or non-AVC compliant bitstream that contains non-AVC information. In this example, the pseudo-AVC bitstream comprises sequence parameters, picture parameters, and slice headers in SVC format, while the slice_data( ) structure is in AVC CAVLC format. At 760, the pseudo-AVC bitstream is output to the DSP 520.

Figure 8:
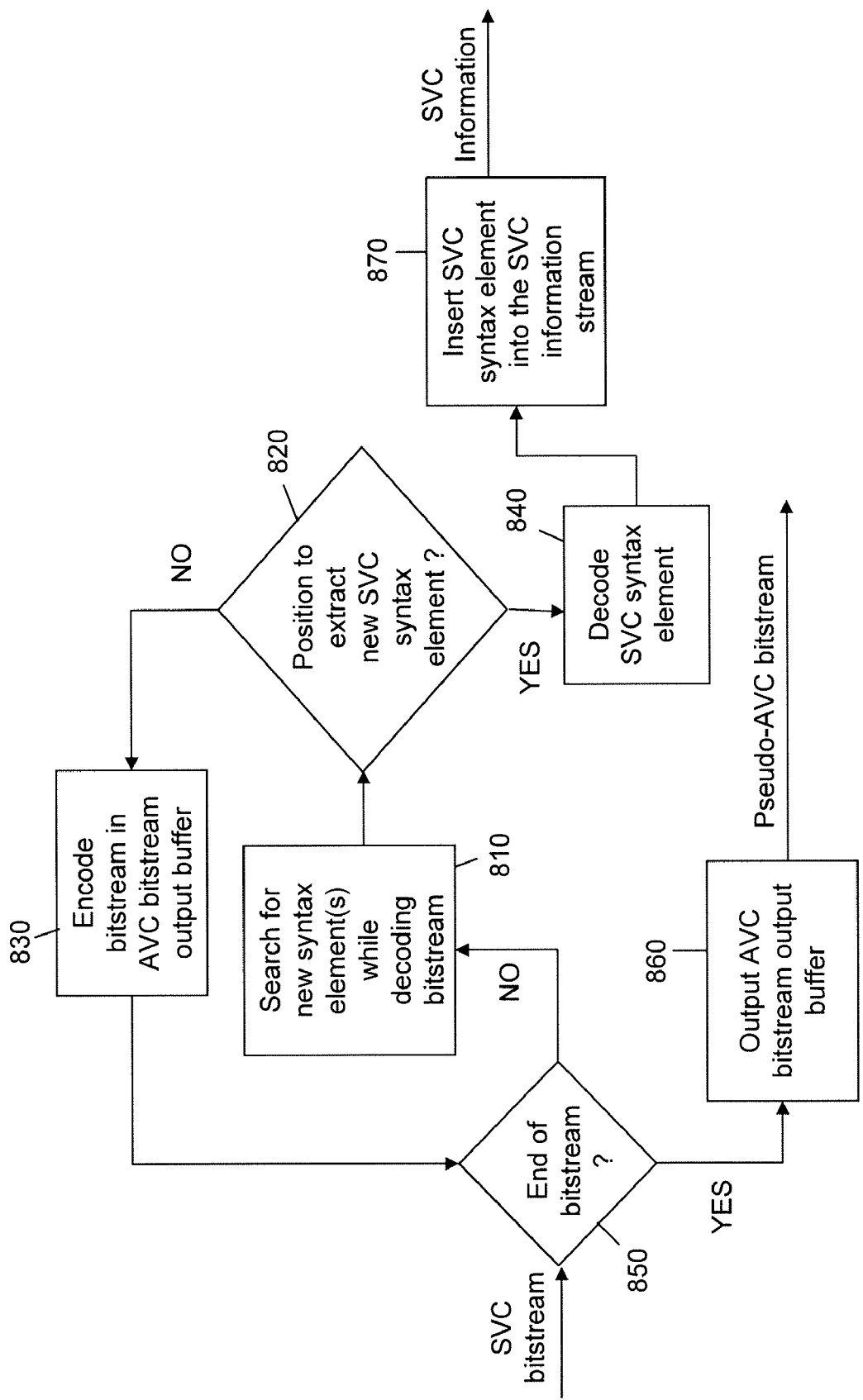
FIG. 8 is an example flow chart depicting a second process that converts a bitstream between two coding standards in the course of the decoding process shown in FIG. 6.

Another example embodiment with respect to producing a video sequence at the second device at step 630 of FIG. 6 is described in conjunction with FIG. 8. In this example, the SVC bitstream is received and decoded in the CABAC format.

At 850, the SVC parser 513 monitors the incoming SVC bitstream for an endpoint, and at 810, searches for a new syntax element(s) while decoding the SVC bitstream. The SVC parser 513 may have to search for more than one syntax element since the SVC syntax elements in a CABAC format are arithmetically coded into a single codeword, and therefore, may comprise more than one syntax element. At 820, the SVC parser 513 determines if the decoded bitstream is ready for new SVC syntax element(s) to be extracted. If it is determined that the bitstream is not ready, then at 830, the decoded bitstream is encoded by the AVC writer 516 into an AVC bitstream output buffer as a pseudo-AVC bitstream. In this example embodiment, the pseudo-AVC bitstream comprises sequence parameters, picture parameters, and slice headers in SVC format, while the slice_data( ) structure is in AVC CABAC format. If the bitstream is ready for a new syntax element to be extracted, then at 840, the SVC parser 513 extracts the SVC syntax element from the decoded bitstream. At 870, the SVC parser 513 inserts or encapsulates the SVC syntax element into the SVC information stream. The SVC information comprises the same information and in the same format as the SVC information described in conjunction with FIGS. 2 and 7.

Referring again to 850, the SVC parser 513 determines if the incoming SVC bitstream is at an endpoint. If and endpoint has not been reached the process continues as described above. If an endpoint has been reached then at 860, the pseudo-AVC bitstream is output to the DSP 520.

The techniques described herein allow for compressing the bitstream that is off-loaded from one device to another device where the bitstream is re-written to another format. Thus, in the encoding direction depicted in FIGS. 1 and 2, the first bitstream generated by the first device 110 is compressed sufficiently so that it (and its accompanying side information) requires minimal bandwidth for off-loading to the second device 120. Likewise, in the decoding direction depicted in FIGS. 5 and 6, the second bitstream generated by the first device 510 is compressed sufficiently so that it (and its accompanying side information) requires minimal bandwidth for up-loading to the second device 520.

Without the techniques describe herein, to fully offload entropy coding would require sending all syntax information. The syntax information includes motion vectors, residual information, and auxiliary data that describes the macroblock partition type and coded block patterns. The residual information will typically consist of 768 bytes per macroblock and the motion vectors consist of 32 bytes per macroblock. Thus, the residual and motion vector data alone is 800 bytes or 6400 bits of information sent per macroblock, in contrast to the 162 bits per macroblock for the SVC information described previously with reference to FIG. 2. The bandwidth savings is almost 40 times greater (6400÷162=~39.5) than that required to fully offload entropy coding for an SVC compliant bitstream. Thus, in the encoding direction, the side information comprises syntax elements and motion vector information sufficient to produce the third bitstream compliant with the second coding standard when combined with the first bitstream, and when transmitted the side information occupies significantly less bandwidth than would otherwise be required to fully offload data from the first device in order to entropy encode the video sequence in accordance with the second coding standard. In the decoding direction, the side information comprises syntax elements and motion vector information sufficient to decode the second bitstream in accordance with the first coding standard, and when received the information occupies significantly less bandwidth than would otherwise be required to fully upload data in order to entropy decode the video sequence in accordance with the first coding standard.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   receiving a video sequence at a first device;
   generating at the first device a first bitstream by encoding the video sequence according to a first coding standard;
   encode at the first device information associated with the video sequence according to a second coding standard that is a scalable video coding (SVC) standard;
   transmitting the first bitstream and the information to a second device;
   decoding at the second device the first bitstream to produce a second bitstream; and
   combining the second bitstream and the information by removing syntax elements associated with the first coding standard from the second bitstream and adding the information to the second bitstream to produce a third bitstream that is encoded according to the second coding standard.

2. The method of claim 1, wherein the third bitstream is an MPEG SVC bitstream.

3. The method of claim 2, wherein the syntax elements comprise advanced video codec (AVC) syntax elements, and wherein combining comprises producing the third bitstream as an SVC bitstream in a context-adaptive variable-length coding (CAVLC) format.

4. The method of claim 2, wherein the syntax elements comprise advanced video codec (AVC) syntax elements, and wherein combining comprises encoding the second bitstream and the information to produce the third bitstream as an SVC bitstream in a context-based binary arithmetic coding (CABAC) format.

5. The method of claim 1, wherein the information comprises syntax elements and motion vector information sufficient to produce the third bitstream compliant with the second coding standard when combined with the first bitstream, and when transmitted the information occupies significantly less bandwidth than would otherwise be required to fully offload data from the first device in order to entropy encode the video sequence in accordance with the second coding standard.

6. The method of claim 1, wherein encoding comprises encoding the information including information for an MPEG SVC macroblock layer structure and a slice data structure.

7. The method of claim 1, wherein encoding comprises encoding the information comprising one or more of a base mode flag, a residual prediction flag, and a motion prediction flag.

8. A method comprising:
   receiving at a first device a first bitstream encoded according to a first coding standard that is a scalable video coding (SVC) standard;
   generating at the first device a decoded bitstream by decoding the first bitstream encoded according to the first coding standard;
   extracting from the decoded bitstream information associated with the first coding standard and adding syntax elements according to a second coding standard to produce a second bitstream according to the second coding standard;
   transmitting the second bitstream and the information to a second device;
   receiving at the second device the second bitstream and the information; and
   decoding at the second device the second bitstream and the information to produce a video sequence.

9. The method of claim 8, wherein the second bitstream comprises an advanced video codec (AVC) bitstream in which selected information from the first coding standard is retained for decoding at the second device.

10. The method of claim 9, wherein the syntax elements comprise MPEG AVC syntax elements, and wherein extracting comprises producing the second bitstream as an AVC bitstream in a context-adaptive variable-length coding (CAVLC) format.

11. The method of claim 9, wherein the syntax elements comprise AVC syntax elements, and wherein extracting comprises encoding the second bitstream as an AVC bitstream in a context-based binary arithmetic coding (CABAC) format.

12. The method of claim 8, wherein the information comprises syntax elements and motion vector information sufficient to decode the second bitstream in accordance with the first coding standard, and when received the information occupies significantly less bandwidth than would otherwise be required to fully upload data in order to entropy decode the video sequence in accordance with the first coding standard.

13. An apparatus comprising:
a first device and a second device configured to be coupled to the first device;
the first device comprising:
a memory configured to store a received video sequence;
an encoder configured to encode the video sequence according to a first coding standard to produce a first bitstream;
a processor configured to encode information associated with the video sequence according to a second coding standard that is a scalable video coding (SVC) standard and further configured to transmit the first bitstream and the information to the second device;
the second device comprising memory configured to store the first bitstream and the information, and logic configured to:
decode the video sequence according to the first coding standard to produce a second bitstream; and
combine the second bitstream and the information by removing syntax elements associated with the first coding standard from the second bitstream and adding the information to the second bitstream to produce a third bitstream that is encoded according to the second coding standard for transmission.

14. The apparatus of claim 13, wherein processor of the first device is further configured to generate sequence, picture, and slice headers according to the second coding standard for transmission to the second device.

15. The apparatus of claim 13, wherein the logic of the second device is configured to produce the second bitstream as an MPEG SVC bitstream.

16. The apparatus of claim 15, wherein the syntax elements comprise advanced video codec (AVC) syntax elements, and wherein the logic of the second device is configured to produce the third bitstream as an SVC bitstream in a context-adaptive variable-length coding (CAVLC) format.

17. The apparatus of claim 15, wherein the syntax elements comprise advanced video codec (AVC) syntax elements, and wherein the logic of the second device is further configured to encode the second bitstream and the information to produce the third bitstream as an SVC bitstream in a context-based binary arithmetic coding (CABAC) format.

18. The apparatus of claim 13, wherein the processing capability of the processor is not sufficient to entropy encode the video sequence according to the second coding standard or a communications bandwidth capability of the processor is not sufficient to fully offload data to the second device in order to entropy encode the video sequence in accordance with the second coding standard.

19. An apparatus comprising:
a first device and a second device configured to be coupled to the first device;
the first device comprising memory configured to store a received bitstream, and logic configured to:
decode the received bitstream encoded according to a first coding standard that is a scalable video coding (SVC) standard to produce a decoded bitstream;
extract from the decoded bitstream information associated with the first coding standard for transmission and adding syntax elements according to a second coding standard to produce a second bitstream according to the second coding standard for transmission;
the second device comprising:
a memory configured to store the second bitstream and the information;
a processor configured to decode the information associated with a video sequence according to the first coding standard to produce decoded information; and
a decoder configured to decode the second bitstream according to the second coding standard using the decoded information and in conjunction with the processor produce the video sequence.

20. The apparatus of claim 19, wherein the logic of the first device is configured to produce the second bitstream as an advanced video codec (AVC) bitstream in which selected information from the first coding standard is retained for decoding at the second device.

21. The apparatus of claim 20, wherein the syntax elements comprise AVC syntax elements, and wherein the logic of the first device is configured to produce the second bitstream as an AVC bitstream in a context-adaptive variable-length coding (CAVLC) format.

22. The apparatus of claim 20, wherein the syntax elements comprise AVC syntax elements, and wherein the logic of the first device configured to encode the second bitstream as an AVC bitstream in a context-based binary arithmetic coding (CABAC) format.

23. The apparatus of claim 19, wherein processor of the second device is further configured to decode sequence, picture, and slice headers for use by the decoder in conjunction with the processor to produce the video sequence.

24. The apparatus of claim 19, wherein the processing capability of the processor is not sufficient to entropy decode the video sequence according to the first coding standard or the communications bandwidth capability of the processor is not sufficient to fully upload data in order to entropy decode the video sequence in accordance with the first coding standard.

* * * * *